(12) United States Patent
Chen et al.

(10) Patent No.: US 6,856,507 B2
(45) Date of Patent: Feb. 15, 2005

(54) PERSONAL DIGITAL ASSISTANT ASSEMBLY

(75) Inventors: Yu-Hsin Chen, Taipei Hsien (TW); Owen Yeh, Taipei Hsien (TW); Jeng Hua Wu, Taipei Hsien (TW); Wei Chung Wang, Taipei Hsien (TW); Jia-Jiunn Chiang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 108 days.

(21) Appl. No.: 10/436,931

(22) Filed: May 12, 2003

(65) Prior Publication Data

US 2004/0066616 A1 Apr. 8, 2004

(30) Foreign Application Priority Data

Oct. 2, 2002 (TW) ...................................... 91215614 U

(51) Int. Cl.⁷ ................................................. G06F 1/16
(52) U.S. Cl. ...................... 361/683; 361/680; 400/472; 235/145 R; 455/344; 455/575.1
(58) Field of Search ............................... 361/683–686, 361/680, 681; 400/82, 88, 89, 719, 472; 235/144 A, 145 R, 146; 455/575.1, 550.1, 575.3, 90.3, 344–350

(56) References Cited

U.S. PATENT DOCUMENTS 6,108,200 A * 8/2000 Fullerton .................... 361/686
6,594,142 B2 * 7/2003 Katz .......................... 361/680
6,658,272 B1 * 12/2003 Lenchik et al. ............. 345/164
6,728,557 B1 * 4/2004 Tracy et al. ............. 455/575.3
6,781,819 B2 * 8/2004 Yang et al. .................. 361/680
6,785,126 B2 * 8/2004 Hazzard et al. ............. 361/680
6,803,904 B2 * 10/2004 Furuki et al. ............... 345/168
2003/0100338 A1 * 5/2003 Lee ............................. 455/556

FOREIGN PATENT DOCUMENTS

TW          347102          12/1998

* cited by examiner

Primary Examiner—Lisa Lea-Edmonds
(74) Attorney, Agent, or Firm—David N. Lathrop, Esq.; Gallagher & Lathrop

(57) ABSTRACT

In a personal digital assistant assembly, a coupling block disposed on an operating surface of a base module is rotatable about a pivot axle transverse to the operating surface. An elongated hinge unit interconnects pivotally a connecting end of a personal digital assistant and the coupling block such that the personal digital assistant is rotatable about a longitudinal axis parallel to the operating surface and transverse to the pivot axle and is movable to a desired angular position relative to the coupling block. The coupling block is movable between an expanded position, where the personal digital assistant uncovers a user input unit on the operating surface of the base module, and a closed position, where the personal digital assistant is capable of covering the user input unit.

5 Claims, 6 Drawing Sheets

PERSONAL DIGITAL ASSISTANT ASSEMBLY

CROSS-REFERENCE TO RELATED APPLICATION

This application claims priority of Taiwanese Application No. 091215614, filed on Oct. 2, 2002.

BACKGROUND OF THE INVENTION

1. Field of the Invention

The invention relates to a personal digital assistant assembly, more particularly to a personal digital assistant assembly having a personal digital assistant that is rotatable relative to a base module with a user input device.

2. Description of the Related Art

FIG. 1 illustrates a conventional personal digital assistant (PDA) that has a base module 11, and a cover module 12 connected pivotally to the base module 11. The base module 11 has an operating surface provided with a handwriting input device 111 and a key set 112 having a plurality of keys thereon, and a data transmission connector 113 that is adapted to be coupled electrically to a computer (not shown) through a cable 13 for data communications with the computer. The cover module 12 is provided with a liquid crystal screen 121. Since the operating surface has a limited area, each of the keys of the key set 112 usually has a limited size, thereby resulting in inconvenience and a lot of mistakes during use. Furthermore, the conventional personal digital assistant will be turned off when the cover module 12 is moved toward the base module 11 to cover the base module 11.

FIG. 2 illustrates a conventional personal digital assistant assembly that includes a personal digital assistant 21 and a keyboard module 22. The personal digital assistant 21 and the keyboard module 22 are connected releasably to each other through connectors 211, 221 such that input data from the keyboard module 22 can be transmitted to the personal digital assistant 21. The personal digital assistant 21 is provided with a touch control screen 212. The keyboard module 22 further has a data transmission connector 222 that is adapted to be coupled electrically to a computer (not shown) through a cable 23 for data communications between the computer and the personal digital assistant 21 when the personal digital assistant 21 is mounted on the keyboard module 22 It is noted that the personal digital assistant 21 and the keyboard module 22 have to be assembled during use and are to be disassembled to permit carrying of the same.

SUMMARY OF THE INVENTION

Therefore, the object of the present invention is to provide a personal digital assistant assembly having a personal digital assistant rotatable that is relative to a base module with a user input device.

According to one aspect of the present invention, a personal digital assistant assembly comprises:

a base module having front and rear ends, and an operating surface provided with a user input device thereon adjacent to the front end;

a pivot unit provided on the operating surface of the base module adjacent to the rear end and having a pivot axle transverse to the operating surface of the base module;

a coupling block disposed on the operating surface of the base module and connected pivotally to the pivot unit such that the coupling block is rotatable about the pivot axle;

a personal digital assistant having a connecting end; and an elongated hinge unit defining a longitudinal axis parallel to the operating surface of the base module and transverse to the pivot axle of the pivot unit, the hinge unit being disposed on the coupling block and interconnecting pivotally the connecting end of the personal digital assistant and the coupling block such that the personal digital assistant is rotatable about the longitudinal axis and is movable to a desired angular position relative to the coupling block;

the coupling block being operable so as to move between an expanded position, where the coupling block is moved away from the front end of the base module such that the personal digital assistant uncovers the user input unit on the operating surface of the base module, and a closed position, where the coupling block is moved toward the front end of the base module such that the personal digital assistant can be rotated about the longitudinal axis so as to cover the user input unit on the operating surface of the base module.

According to another aspect of the present invention, a personal digital assistant assembly comprises:

a base module having front and rear ends, and an operating surface;

a pivot unit provided on the operating surface of the base module adjacent to the rear end and having a pivot axle transverse to the operating surface of the base module;

a coupling block disposed on the operating surface of the base module and connected pivotally to the pivot unit such that the coupling block is rotatable about the pivot axle;

a personal digital assistant module having a connecting end;

a user input device provided on one of the base module and the personal digital assistant module;

a liquid crystal module provided on the other one of the base module and the personal digital assistant module; and an elongated hinge unit defining a longitudinal axis parallel to the operating surface of the base module and transverse to the pivot axle of the pivot unit, the hinge unit being disposed on the coupling block and interconnecting pivotally the connecting end of the personal digital assistant module and the coupling block such that the personal digital assistant module is rotatable about the longitudinal axis and is movable to a desired angular position relative to the coupling block;

the coupling block being operable so as to move between an expanded position, where the coupling block is moved away from the front end of the base module such that the personal digital assistant module uncovers the operating surface of the base module, and a closed position, where the coupling block is moved toward the front end of the base module such that the personal digital assistant module can be rotated about the longitudinal axis so as to be superimposed on the operating surface of the base module.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
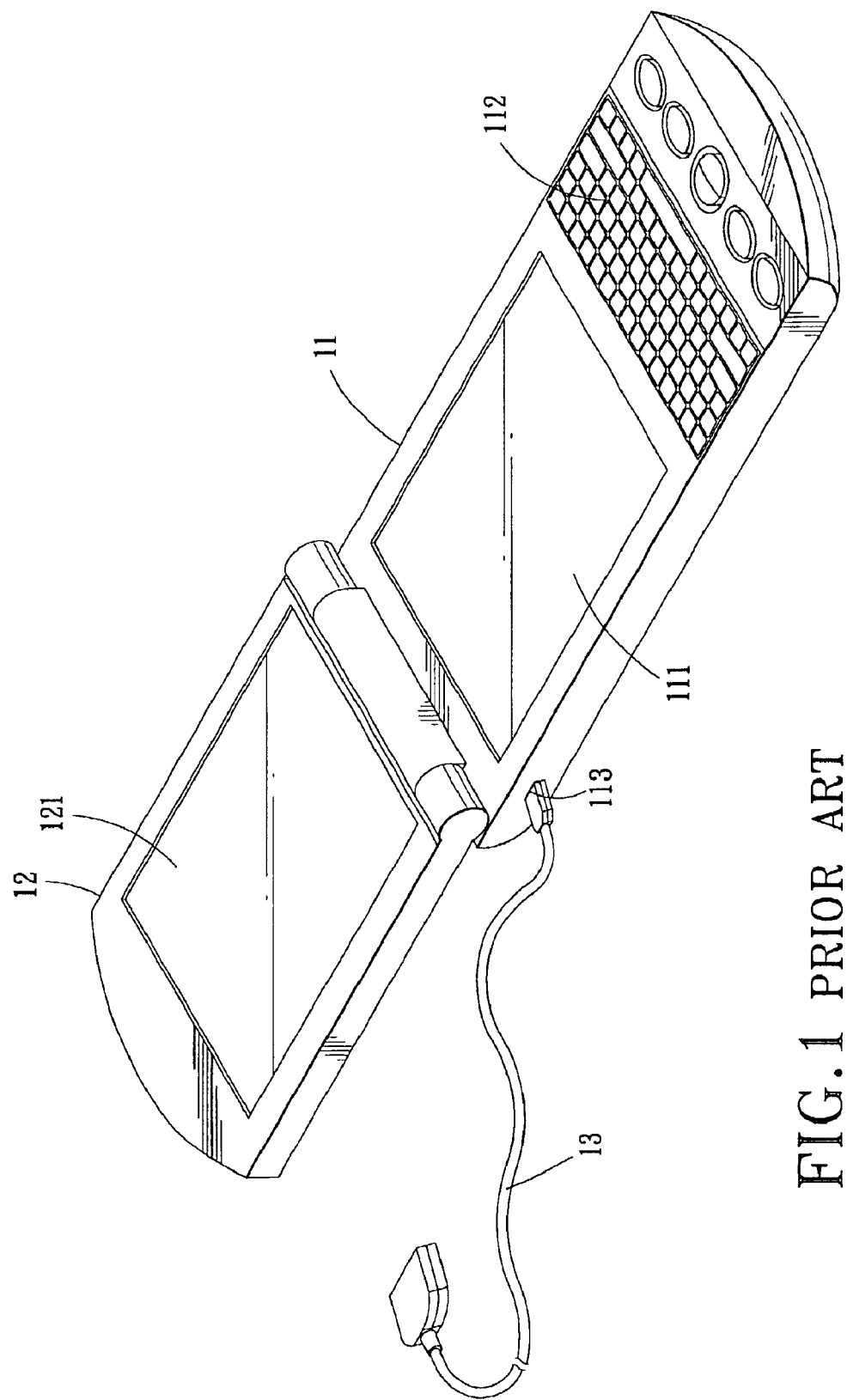
FIG. 1 is a perspective view showing a conventional personal digital assistant.
Figure 2:
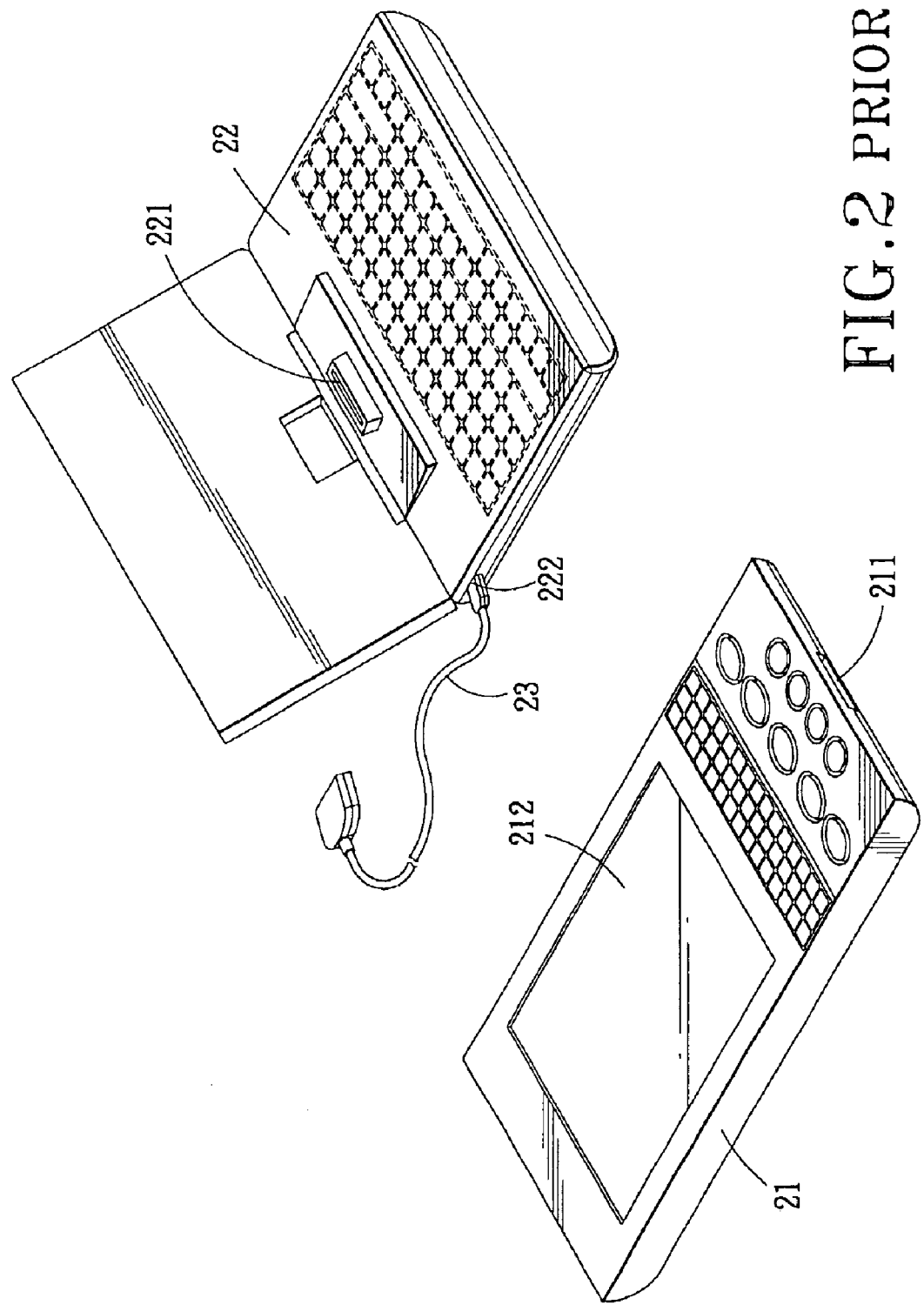
FIG. 2 is a perspective view showing a conventional personal digital assistant assembly.

Before the present invention is described in greater detail, it should be noted that like elements are denoted by the same reference numerals throughout the disclosure.

Figure 3:
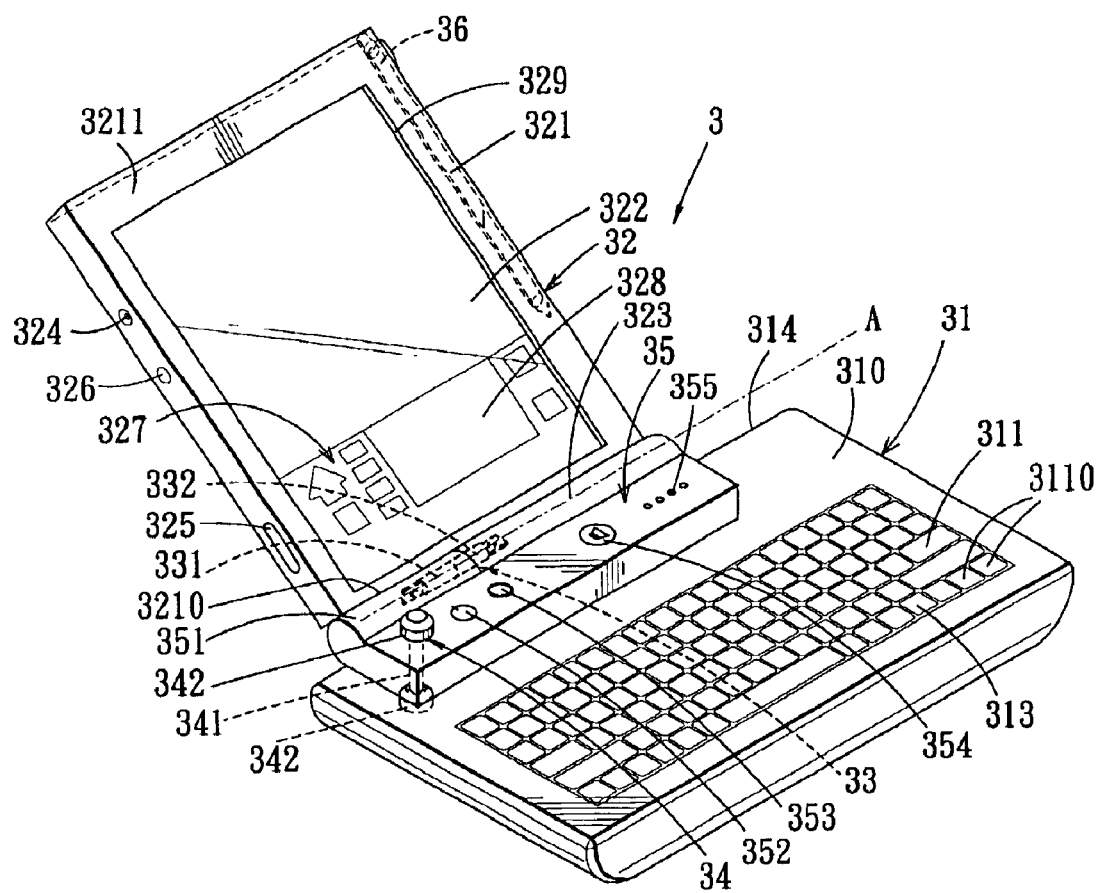
FIG. 3 is a perspective view showing the first preferred embodiment of a personal digital assistant assembly according to the present invention.
Figure 6:
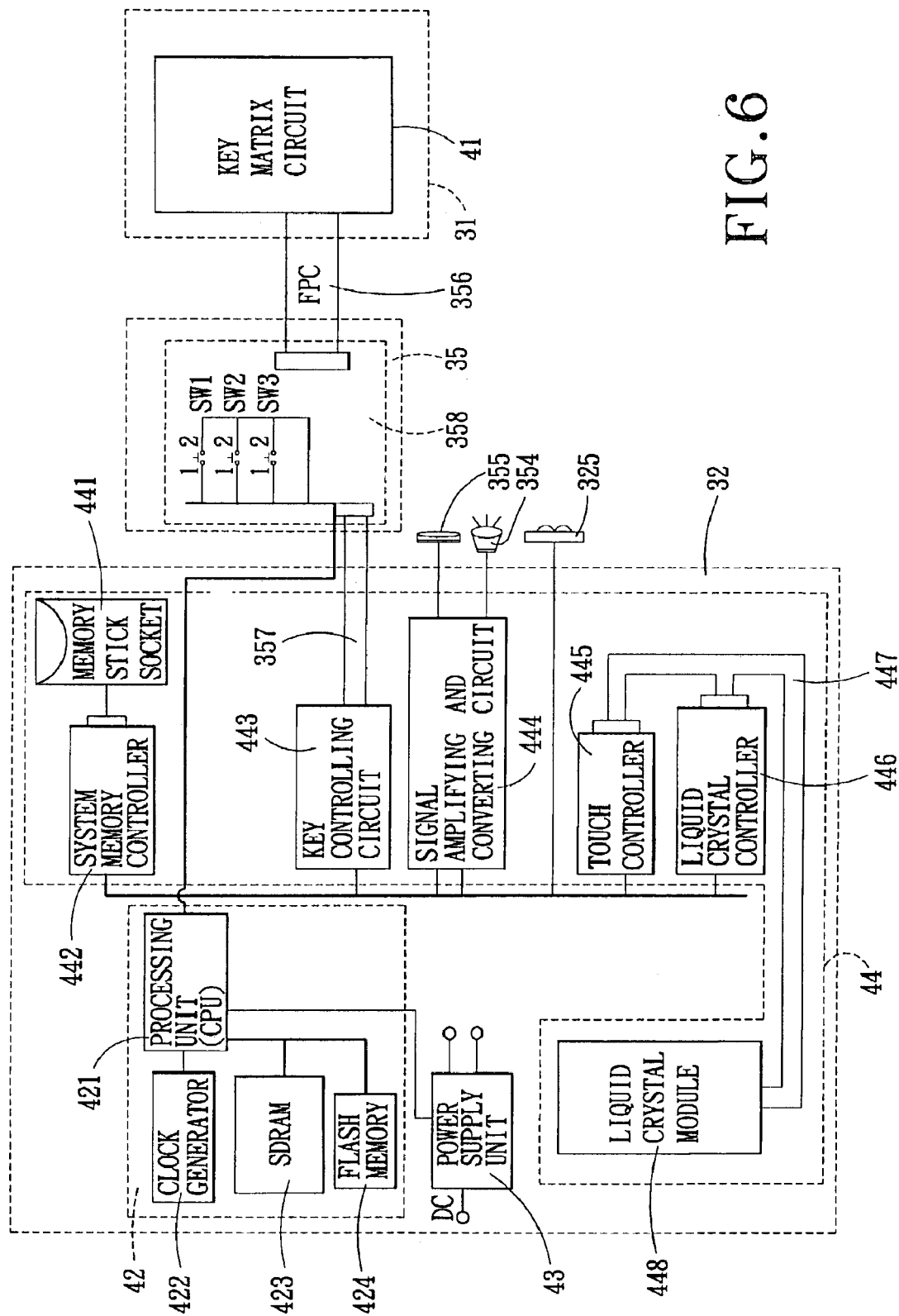
FIG. 6 is a schematic electrical circuit block diagram of the first preferred embodiment.

Referring to FIGS. 3 and 6, the first preferred embodiment of a personal digital assistant assembly 3 according to the present invention is shown to include a base module 31, a pivot unit 34, a coupling block 35, a personal digital assistant 32, and an elongated hinge unit 33.

The base module 31 has front and rear ends 313, 314, and an operating surface 310 provided with a user input device thereon adjacent to the front end 313. In this embodiment, the user input device includes a keyboard unit 311. The base module 31 includes a key matrix circuit 41 (see FIG. 6).

The pivot unit 34 is provided on the operating surface 310 of the base module 31 adjacent to the rear end 314, and has a pivot axle 341 transverse to the operating surface 310 of the base module 31. In this embodiment, the pivot axle 341 has a first end extending downwardly through the base module 31, and a second end opposite to the first end and extending upwardly from the operating surface 310. The pivot unit 34 further has two mounting pieces 342 mounted on the first and second ends of the pivot axle 341, respectively.

The coupling block 35 is disposed on the operating surface 310 of the base module 31 and is connected pivotally to the pivot unit 34 such that the coupling block 35 is rotatable about the pivot axle 341. In this embodiment, the coupling block 35 is provided with a plurality of function keys, such as a power key 352 and a menu key 353, a loudspeaker 354 and a microphone 355 thereon. The coupling block 35 has a flexible circuit board 358 coupled to the key matrix circuit 41 of the base module 31 by means of flexible printed circuit (FPC) 356 and including a plurality of switches (SW1, SW2, SW3) operated by the function keys, as shown in FIG. 6.

In this embodiment, the personal digital assistant 32 has a housing 321. The housing 321 has a connecting end 3210, and an operating surface 3211 provided with a touch-control display screen 329 thereon. The touch-control display screen 329 has a display region 322, a key set region 327 and a hand-writing region 328 displayed thereon. A touch pen 36 is mounted removably in the housing 36. An earphone jack 324, an infrared communications port 325 and a record key 326 are provided on a lateral side of the housing 321. The personal digital assistant 32 includes a control device 42 having a processing unit 421, a clock generator 422, an SRAM 423 and a flash memory 424, a power supply unit 43 coupled to the processing unit 421 for supplying electrical power thereto, and a driving unit 44 coupled to and controlled by the processing unit 421. The driving unit 44 includes a key controlling circuit 443 controlled by the processing unit 421 and coupled to the key matrix circuit 41 of the base module 31 through another flexible circuit board 357, a system memory controller 442 adapted to be coupled to an external memory card (not shown) by means of a memory stick socket 441, a signal amplifying and converting circuit 444 coupled to the processing unit 421, the loudspeaker 354 and the microphone 355, a touch controller 445, a liquid crystal controller 446 for receiving data from the processing unit 421 and converting the data into pixel basis data streams, and a liquid crystal module 448 coupled to the touch controller 445 and the liquid crystal controller 446 by means of a flat printed cable 447.

The hinge unit 33 defines a longitudinal axis (A) parallel to the operating surface 310 of the base module 31 and transverse to the pivot axle 341 of the pivot unit 34. The hinge unit 33 is disposed on the coupling block 35 and interconnects pivotally the connecting end 3210 of the housing 321 of the personal digital assistant 32 and the coupling block 35 in a conventional manner such that the personal digital assistant 32 is rotatable about the longitudinal axis (A) and is movable to a desired angular position relative to the coupling block 35, as shown in FIG. 3. In this embodiment, the hinge unit 33 includes a stationary tubular member 331 extending along the longitudinal axis (A) and mounted securely in a pivot portion 351 of the coupling block 35, a rotary tubular member 332 sleeved within the stationary tubular member 331 and extending outwardly of the stationary tubular member 331 along the longitudinal axis (A) and into a pivot portion 323 that is formed on the connecting end 3210 of the housing 321 of the personal digital assistant 32, and a positioning member (not shown) disposed between the stationary and rotary tubular members 331, 332.

Figure 4:
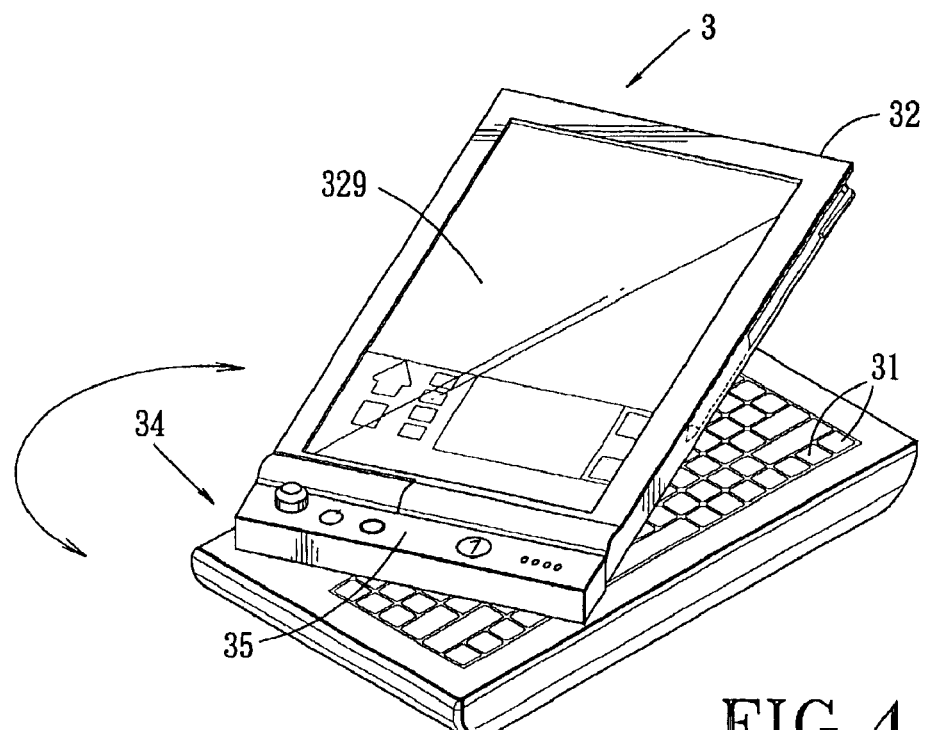
FIG. 4 is a perspective view showing how a personal digital assistant can be rotated relative to a base module in the first preferred embodiment.
Figure 5:
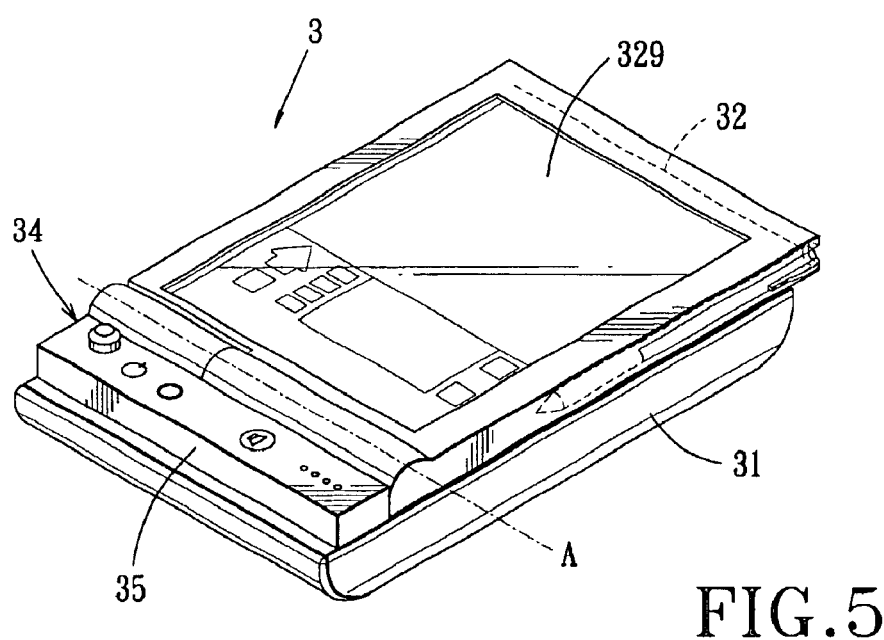
FIG. 5 is a perspective view showing the personal digital assistant when superimposed on the base module.

In sum, the coupling block 35 is operable so as to move between an expanded position, where the coupling block 35 is moved away from the front end 313 of the base module 31 such that the personal digital assistant 32 uncovers the keyboard unit 311 on the operating surface 310 of the base module 31, as shown in FIG. 3, and a closed position, where the coupling block 35 is moved toward the front end 313 of the base module 31 (see FIG. 4) such that the personal digital assistant 32 can be rotated about the longitudinal axis (A) so as to cover the keyboard unit 311 on the operating surface 310 of the base module 31, as shown in FIG. 5. As such, the personal digital assistant assembly 3 of this invention has a relatively small size when the coupling block 35 is at the closed position, thereby making it convenient to carry.

Moreover, it is noted that the touch-control display screen 329 of the personal digital assistant 32 is exposed even when the coupling block 35 is at the closed position such that operation of the personal digital assistant 32 is still possible to facilitate use of the same.

Figure 7:
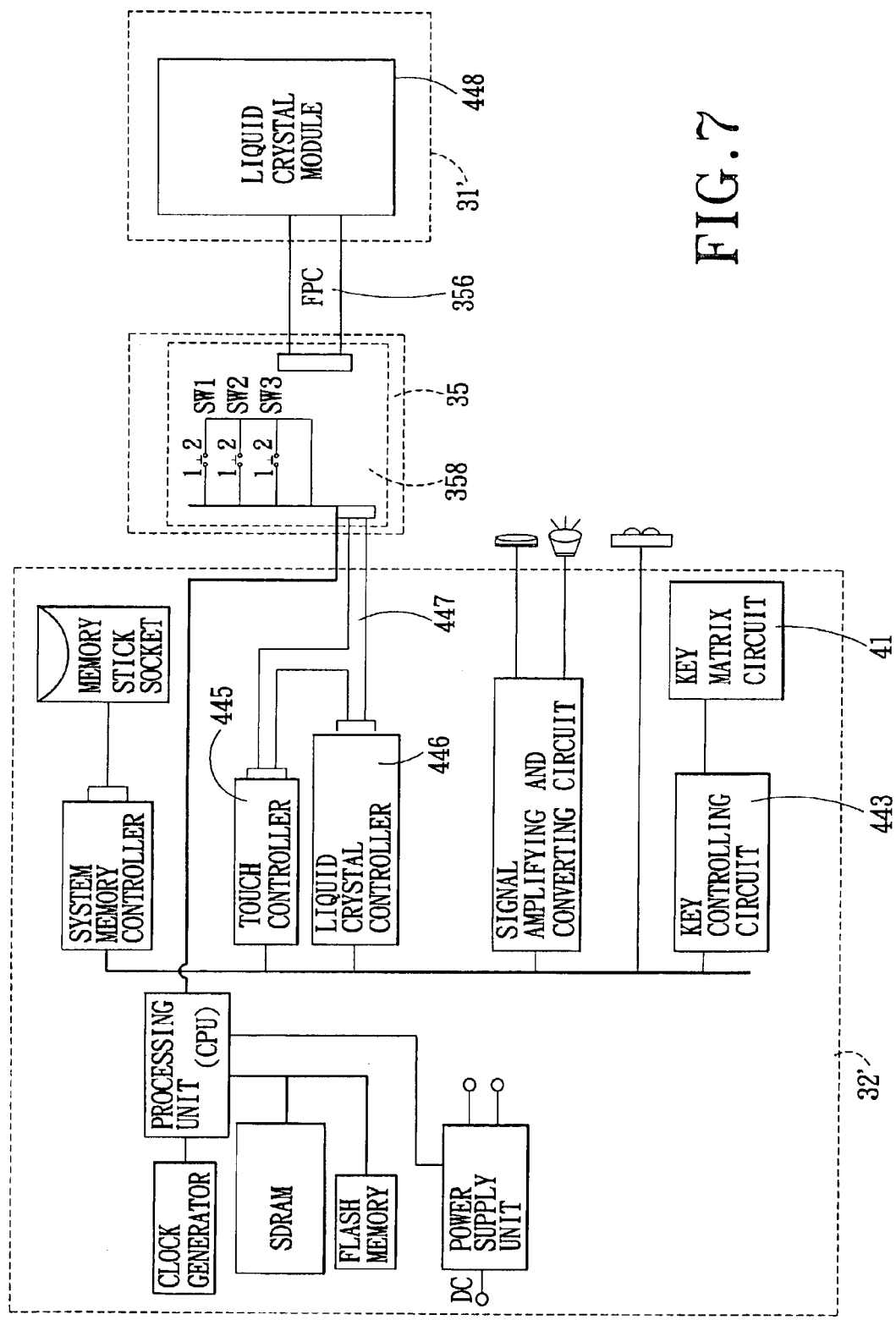
FIG. 7 is a schematic electrical circuit block diagram of the second preferred embodiment of a personal digital assistant assembly according to the present invention.

FIG. 7 illustrates the second preferred embodiment of a personal digital assistant assembly according to this invention, which is a modification of the first preferred embodiment. Unlike the previous embodiment, the base module 31' only has the liquid crystal module 448 provided on its operating surface and coupled to the touch controller 445 and the liquid crystal controller 446 through the flexible circuit board 358 in the coupling block 35 and the flat printed cable 447. The personal digital assistant 32' further has the key matrix circuit 41 coupled to the key controlling circuit 443, but is not provided with the liquid crystal module at taught in the arrangement of the first preferred embodiment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A personal digital assistant assembly comprising:

a base module having front and rear ends, and an operating surface provided with a user input device thereon adjacent to said front end;

a pivot unit provided on said operating surface of said base module adjacent to said rear end and having a pivot axle transverse to said operating surface of said base module;

a coupling block disposed on said operating surface of said base module and connected pivotally to said pivot unit such that said coupling block is rotatable about said pivot axle;

a personal digital assistant having a connecting end; and an elongated hinge unit defining a longitudinal axis parallel to said operating surface of said base module and transverse to said pivot axle of said pivot unit, said hinge unit being disposed on said coupling block and interconnecting pivotally said connecting end of said personal digital assistant and said coupling block such that said personal digital assistant is rotatable about the longitudinal axis and is movable to a desired angular position relative to said coupling block;

said coupling block being operable so as to move between an expanded position, where said coupling block is moved away from said front end of said base module such that said personal digital assistant uncovers said user input unit on said operating surface of said base module, and a closed position, where said coupling block is moved toward said front end of said base module such that said personal digital assistant can be rotated about the longitudinal axis so as to cover said user input unit on said operating surface of said base module.

2. The personal digital assistant assembly as claimed in claim 1, wherein said user input device includes at least one of a handwriting input unit and a keyboard unit, said keyboard unit having a plurality of keys.

3. The personal digital assistant assembly as claimed in claim 1, wherein said base module includes a key matrix circuit, said personal digital assistant including a processing unit, a power supply unit coupled to said processing unit for supplying electrical power thereto, and a driving unit coupled to and controlled by said processing unit.

4. The personal digital assistant assembly as claimed in claim 3, wherein said driving unit includes a key controlling circuit, a system memory controller, a signal amplifying and converting circuit, a touch controller, a liquid crystal controller and a liquid crystal module.

5. A personal digital assistant assembly comprising:

a base module having front and rear ends, and an operating surface;

a pivot unit provided on said operating surface of said base module adjacent to said rear end and having a pivot axle transverse to said operating surface of said base module;

a coupling block disposed on said operating surface of said base module and connected pivotally to said pivot unit such that said coupling block is rotatable about said pivot axle;

a personal digital assistant module having a connecting end;

a user input device provided on one of said base module and said personal digital assistant module;

a liquid crystal module provided on the other one of said base module and said personal digital assistant module; and an elongated hinge unit defining a longitudinal axis parallel to said operating surface of said base module and transverse to said pivot axle of said pivot unit, said hinge unit being disposed on said coupling block and interconnecting pivotally said connecting end of said personal digital assistant module and said coupling block such that said personal digital assistant module is rotatable about the longitudinal axis and is movable to a desired angular position relative to said coupling block;

said coupling block being operable so as to move between an expanded position, where said coupling block is moved away from said front end of said base module such that said personal digital assistant module uncovers said operating surface of said base module, and a closed position, where said coupling block is moved toward said front end of said base module such that said personal digital assistant module can be rotated about the longitudinal axis so as to be superimposed on said operating surface of said base module.

* * * * *